United States Patent
Yoshikawa et al.

(10) Patent No.: US 12,124,071 B2
(45) Date of Patent: Oct. 22, 2024

(54) BACKLIGHT UNIT AND IMAGE DISPLAY DEVICE

(71) Applicant: NITTO DENKO CORPORATION, Ibaraki (JP)

(72) Inventors: Takahiro Yoshikawa, Ibaraki (JP); Daisuke Hattori, Ibaraki (JP); Ryota Morishima, Ibaraki (JP); Atsushi Kishi, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/914,436

(22) PCT Filed: Mar. 29, 2021

(86) PCT No.: PCT/JP2021/013165
§ 371 (c)(1),
(2) Date: Sep. 26, 2022

(87) PCT Pub. No.: WO2021/200770
PCT Pub. Date: Oct. 7, 2021

(65) Prior Publication Data
US 2023/0350129 A1    Nov. 2, 2023

(30) Foreign Application Priority Data
Mar. 30, 2020    (JP) .................. 2020-059333

(51) Int. Cl.
*F21V 8/00*    (2006.01)

(52) U.S. Cl.
CPC ......... *G02B 6/0055* (2013.01); *G02B 6/0088* (2013.01)

(58) Field of Classification Search
CPC .. G02B 6/0055; G02B 6/0088; G02B 6/0011; G02B 6/013; G02B 6/0023
See application file for complete search history.

(56) References Cited

U.S. PATENT DOCUMENTS 10,884,178 B2 *   1/2021   Kim ................... G02B 6/0055
11,249,238 B2    2/2022   Rinko et al.
(Continued)

FOREIGN PATENT DOCUMENTS

EP    3382446 A1    10/2018
JP    H10-062626 A    3/1998
(Continued)

OTHER PUBLICATIONS

International Search Report dated May 18, 2021, issued in counterpart application PCT/JP2021/013165.
Extended (Supplementary) European Search Report dated Apr. 26, 2024, issued in counterpart EP application No. 21780575.3. (7 pages).
(Continued)

*Primary Examiner* — Matthew J. Peerce
(74) *Attorney, Agent, or Firm* — WHDA, LLP (57) ABSTRACT

A backlight unit includes: a light source; a light guide plate arranged to face the light source, having an end surface that light from the light source enters; and an emitting surface from which the entered light is emitted; a reflective plate bonded to a back surface side of the light guide plate via a double-sided pressure-sensitive adhesive film; and a casing having a front portion and a back portion, the casing configured to store the light source, the light guide plate, and the reflective plate. The backlight unit is configured so that light from the light source is free from entering a space between the low-refractive index layer and the reflective plate, or so that light that has entered the space between the low-refractive index layer and the reflective plate from a light source is free from being emitted from the emitting surface of the light guide plate.

4 Claims, 4 Drawing Sheets

(56) References Cited

U.S. PATENT DOCUMENTS

| | | | | |
|---|---|---|---|---|
| 11,402,569 B2* | 8/2022 | Hattori | ............... | G02B 6/0088 |
| 2014/0340586 A1* | 11/2014 | Terashima | ........... | G02B 6/0031 |
| | | | | 348/790 |
| 2016/0370527 A1* | 12/2016 | Chang | ............... | G02B 6/0055 |
| 2018/0149800 A1 | 5/2018 | Kim et al. | | |
| 2020/0116921 A1 | 4/2020 | Hattori et al. | | |
| 2020/0257044 A1 | 8/2020 | Rinko | | |
| 2021/0003766 A1 | 1/2021 | Rinko | | |
| 2021/0011211 A1 | 1/2021 | Rinko | | |
| 2021/0026086 A1 | 1/2021 | Rinko et al. | | |
| 2021/0048575 A1 | 2/2021 | Rinko et al. | | |
| 2021/0109274 A1 | 4/2021 | Rinko et al. | | |
| 2022/0035090 A1 | 2/2022 | Rinko et al. | | |

FOREIGN PATENT DOCUMENTS

| | | |
|---|---|---|
| JP | 2017-103168 A | 6/2017 |
| KR | 20180062547 A | 6/2018 |
| KR | 20190087633 A | 7/2019 |
| TW | 201712648 A | 4/2017 |
| WO | 2018/143176 A1 | 8/2018 |
| WO | 2019/182091 A1 | 9/2019 |

OTHER PUBLICATIONS

Office Action dated Aug. 1, 2024, issued in counterpart TW Application No. 110111364, with English translation. (7 pages).
Office Action dated Sep. 9, 2024, issued in counterpart KR Application No. 10-2022-7032029, with English translation. (16 pages).

* cited by examiner

BACKLIGHT UNIT AND IMAGE DISPLAY DEVICE

TECHNICAL FIELD

The present invention relates to a backlight unit.

BACKGROUND ART

There has been known a technology including laminating a light guide plate and a reflective plate through intermediation of a low-refractive index layer in the backlight unit of an image display apparatus (typically, a liquid crystal display apparatus). It has been reported that according to such technology, the intermediation of the low-refractive index layer improves light utilization efficiency as compared to that in the case where the plates are simply laminated only with a pressure-sensitive adhesive. However, according even to such technology, light from a light source is emitted near a surface that the light enters, and hence brightness uniformity is not sufficient in some cases.

CITATION LIST

Patent Literature

[PTL 1] JP 10-62626 A

SUMMARY OF INVENTION

Technical Problem

The present invention has been made to solve the above-mentioned conventional problem, and a primary object of the present invention is to provide a backlight unit excellent in brightness uniformity.

Solution to Problem

A backlight unit according to one embodiment of the present invention includes: a light source; a light guide plate that is arranged to face the light source, having an end surface that light from the light source enters; and an emitting surface from which the entered light is emitted; a reflective plate bonded to a back surface side of the light guide plate via a double-sided pressure-sensitive adhesive film; and a casing having a front portion and a back portion, the casing being configured to store the light source, the light guide plate, and the reflective plate. The double-sided pressure-sensitive adhesive film includes a first pressure-sensitive adhesive layer, a low-refractive index layer, and a second pressure-sensitive adhesive layer in the stated order from the light guide plate side. The backlight unit is configured so that the light from the light source is free from entering a space between the low-refractive index layer and the reflective plate, or so that the light that has entered the space between the low-refractive index layer and the reflective plate from a light source is free from being emitted from the emitting surface of the light guide plate.

In one embodiment, a light source-side end surface of the double-sided pressure-sensitive adhesive film and a light source-side end surface of the reflective plate are substantially flush with each other.

In one embodiment, the reflective plate has a light-shielding printed portion arranged near a light source-side end portion thereof.

In one embodiment, the low-refractive index layer has arranged on a light source-side end surface thereof a light-shielding portion selected from a light-shielding tape, a solidified product or a cured product of an applied film of a light-shielding resin solution, and a light-shielding formed body.

In one embodiment, the reflective plate has an extending portion extending toward the light source with respect to the double-sided pressure-sensitive adhesive film, and the extending portion has arranged thereon a light-shielding portion selected from a light-shielding tape, a solidified product or a cured product of an applied film of a light-shielding resin solution, and a light-shielding formed body.

In one embodiment, the low-refractive index layer and the reflective plate each have an extending portion extending toward the light source with respect to the light guide plate.

In one embodiment, the extending portion of the low-refractive index layer further has arranged thereon a reflective layer.

In one embodiment, a light source-side end portion of the light guide plate has formed therein a void portion, which is defined by causing end surfaces of the double-sided pressure-sensitive adhesive film and the reflective plate to be more distant from the light source than the end surface of the light guide plate is, and the void portion has arranged therein a light-shielding portion selected from a light-shielding tape, a solidified product or a cured product of an applied film of a light-shielding resin solution, and a light-shielding formed body.

In one embodiment, a light source-side end portion of the light guide plate has formed therein a void portion, which is defined by causing end surfaces of the double-sided pressure-sensitive adhesive film and the reflective plate to be more distant from the light source than the end surface of the light guide plate is, and a position of the back portion of the casing corresponding to the void portion has arranged thereon a protruding portion matching a shape of the void portion.

In one embodiment, the light source is a LED light source.

According to another aspect of the present invention, there is provided an image display apparatus. The image display apparatus includes: the backlight unit as described above; and an image display panel arranged on an emitting surface side of the light guide plate.

Advantageous Effects of Invention

According to the present invention, the backlight unit including the light guide plate and the reflective plate bonded to each other via the double-sided pressure-sensitive adhesive film including the low-refractive index layer is configured so that no light enters from the light source-side end surface of the low-refractive index layer. Thus, the backlight unit excellent in brightness uniformity can be achieved.

DESCRIPTION OF EMBODIMENTS

Embodiments of the present invention are described below. However, the present invention is not limited to these embodiments.

A. Overall Configuration of Backlight Unit

Figure 1:
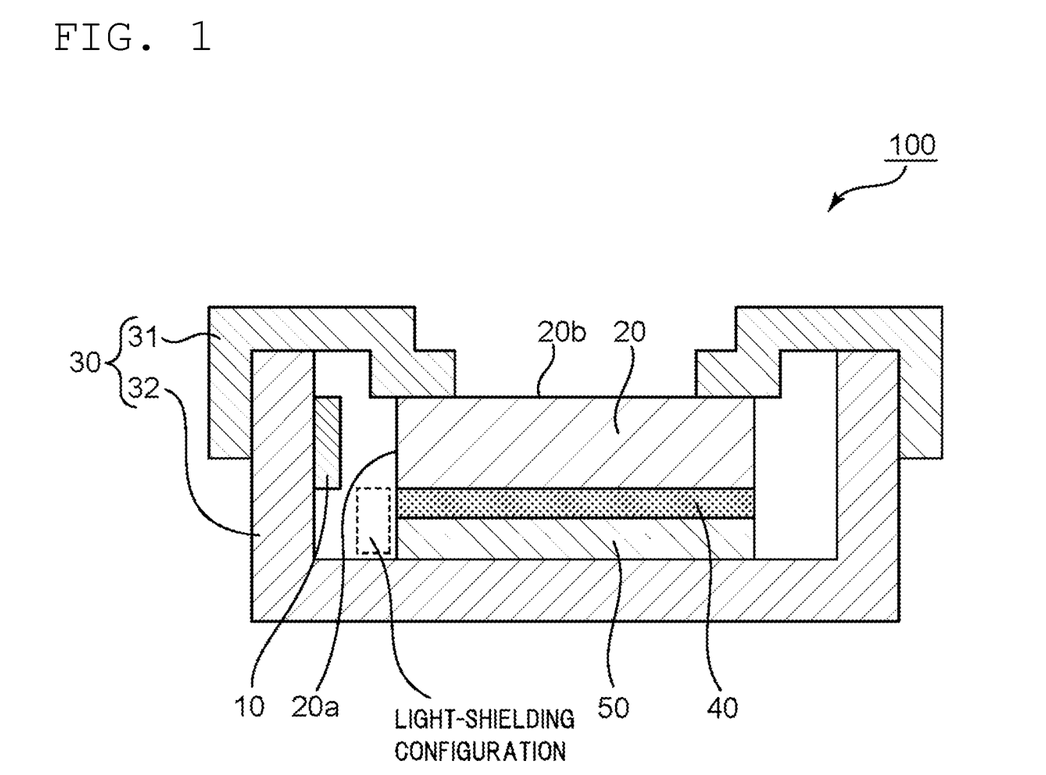
FIG. 1 is a schematic sectional view of a backlight unit according to one embodiment of the present invention.
Figure 2:
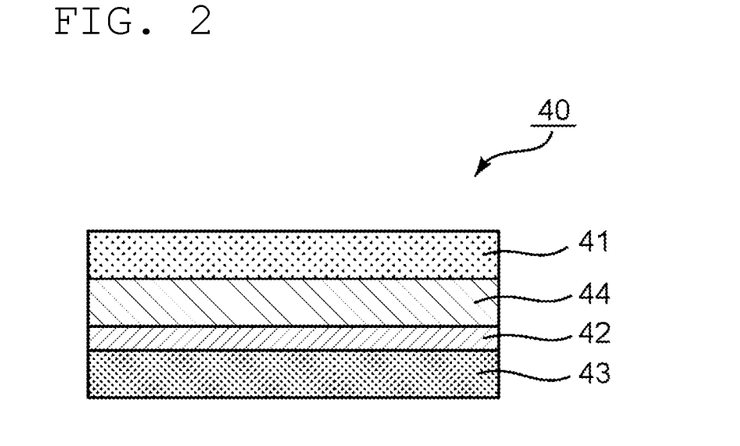
FIG. 2 is a schematic sectional view of a double-sided pressure-sensitive adhesive film that may be used in the backlight unit of FIG. 1.

FIG. 1 is a schematic sectional view of a backlight unit according to one embodiment of the present invention, and FIG. 2 is a schematic sectional view of a double-sided pressure-sensitive adhesive film to be used in the backlight unit of FIG. 1. A backlight unit 100 of the illustrated example includes a light source 10, a light guide plate 20, a casing 30, a double-sided pressure-sensitive adhesive film 40, and a reflective plate 50. The back surface side of the light guide plate 20 and the reflective plate 50 are bonded to each other via the double-sided pressure-sensitive adhesive film 40. The casing 30 has a front portion 31 and a back portion 32, and is configured to store the light source 10, the light guide plate 20, and the reflective plate 50. The back portion 32 has a box shape whose upper portion (front surface side) is opened, and in a pair of end portions of the back portion 32 opposing each other, the front portion 31 protrudes inward from the back portion. The front portion 31 and the back portion 32 are typically fixed to and integrated with each other. Such configuration enables the casing 30 to fit the light guide plate 20 and the reflective plate 50 thereinto. Any appropriate optical member (not shown) may be typically mounted (bridged) on the step portions (portions protruding inward) of the front portion. Examples of the optical member include a diffusing sheet and a prism sheet. The diffusing sheet and/or the prism sheet may be mounted in plurality. The casing 30 of the illustrated example is the back surface-side portion of the casing for storing the entirety of an image display apparatus.

The light source 10 is arranged on one end portion side of the light guide plate 20 to face an end surface 20a of the light guide plate. Accordingly, the backlight unit is typically an edge light system. The light source 10 is typically surrounded by a reflector (not shown). Any appropriate configuration may be adopted as the light source. Specific examples thereof include a light emitting diode (LED), a cold cathode fluorescent lamp (CCFL), an external electrode fluorescent lamp (EEFL), and a hot cathode fluorescent lamp (HCFL). In one embodiment, a LED light source may be used. The LED light source may be typically formed by arranging LEDs (point light sources) in a line.

The light guide plate 20 has the end surface 20a that light from the light source enters and an emitting surface 20b from which the entered light is emitted. The end surface 20a of the light guide plate 20 is arranged to face the light source 10. More specifically, the light guide plate 20 guides the light that has entered the end surface 20a from the light source 10 toward an end portion opposite to the end surface 20a while subjecting the light to a reflective action or the like therein, and in the light guide process, the plate gradually emits the light from the emitting surface 20b. An emission pattern is typically arranged on the emitting surface 20b. The emission pattern is, for example, an uneven shape. Further, a light extraction pattern is typically arranged on the surface of the light guide plate opposite to the emitting surface. The light extraction pattern is, for example, a white dot. Any appropriate configuration may be adopted as the light guide plate. Any appropriate material may be used as a material for forming the light guide plate as long as the light applied from the light source can be efficiently guided. Examples of the material for forming the light guide plate include an acrylic resin such as polymethyl methacrylate (PMMA), a polycarbonate (PC) resin, a polyethylene terephthalate (PET) resin, and a styrene resin. In one embodiment, the back surface side of the light guide plate 20 is bonded to a flexible printed circuit board for a light source via any appropriate means (e.g., a pressure-sensitive adhesive tape).

The double-sided pressure-sensitive adhesive film 40 includes a first pressure-sensitive adhesive layer 41, a low-refractive index layer 42, and a second pressure-sensitive adhesive layer 43 from the light guide plate 20 side. A substrate 44 is practically arranged between the first pressure-sensitive adhesive layer 41 and the low-refractive index layer 42. More specifically, the low-refractive index layer 42 is formed on the surface of the substrate 44, and the first pressure-sensitive adhesive layer 41 and the second pressure-sensitive adhesive layer 43 may be arranged on both the sides of the laminate of the substrate 44 and the low-refractive index layer 42.

Any appropriate reflective plate may be used as the reflective plate 50. For example, the reflective plate may be a mirror-surface reflective plate, or may be a diffusing reflective plate. Specific examples of the reflective plate include: a resin sheet having a high reflectance (e.g., an acrylic plate); a metal thin plate or metal foil made of aluminum, stainless steel, or the like; a deposited sheet obtained by depositing aluminum, silver, or the like from the vapor onto a substrate such as a resin film made of polyester or the like; a laminate of a substrate such as a resin film made of polyester or the like and metal foil made of aluminum or the like; and a resin film having formed therein voids. The arrangement of the reflective plate 50 can improve light utilization efficiency in the backlight unit.

In the embodiment of the present invention, the backlight unit 100 is configured so that the light from the light source does not enter a space between the low-refractive index layer 42 and the reflective plate 50, or so that the light that has entered the space between the low-refractive index layer 42 and the reflective plate 50 from the light source is not emitted from the emitting surface 20b of the light guide plate 20. In this description, such configuration is referred to as "light-shielding configuration." The arrangement of the light-shielding configuration can significantly suppress light leakage near the surface that the light from the light source enters, and as a result, can achieve a backlight unit excellent in brightness uniformity.

The light-shielding configuration and the double-sided pressure-sensitive adhesive film 40 are described in detail below.

B. Light-Shielding Configuration

FIG. 3(a) to FIG. 3(c) are each a schematic partial sectional view for illustrating a specific example of the light-shielding configuration. In each of the examples illustrated in FIG. 3(a) and FIG. 3(b), the light source-side end surface of the double-sided pressure-sensitive adhesive film 40 and the light source-side end surface of the reflective plate 50 are substantially flush with each other (i.e., the end surfaces are present at the same position).

In the example illustrated in FIG. 3(a), a light-shielding printed portion 52 is arranged near the light source-side end portion of the reflective plate 50. The light-shielding printed layer is typically a solid colored layer, preferably a black colored layer. The total light transmittance of the light-shielding printed layer in a thickness of from 3 μm to 5 μm is preferably 0.01% or less, more preferably 0.008% or less. The total light transmittance of the light-shielding printed layer is preferably as small as possible, and its lower limit may be, for example, 0.001%. When the total light transmittance of the light-shielding printed layer falls within such ranges, the layer can achieve an excellent light-shielding function. The thickness of the light-shielding printed layer is preferably from 3 μm to 5 μm. When the thickness falls within such range, appropriate selection of a material for forming the layer facilitates the achievement of a desired total light transmittance (consequently, a desired light-shielding function).

The light-shielding printed layer may be formed by any appropriate printing method using any appropriate ink or paint. Specific examples of the printing method include gravure printing, offset printing, silkscreen printing, and transfer printing from a transfer sheet.

The ink or paint to be used typically contains a binder, a colorant, a solvent, and any appropriate additive that may be used as required. Examples of the binder include chlorinated polyolefins (e.g., chlorinated polyethylene and chlorinated polypropylene), a polyester-based resin, a urethane-based resin, an acrylic resin, a vinyl acetate resin, a vinyl chloride-vinyl acetate copolymer, and a cellulose-based resin. The binder resins may be used alone or in combination thereof. In one embodiment, the binder resin is a thermally polymerizable resin. The thermally polymerizable resin only needs to be used in a small amount as compared to a photopolymerizable resin, and hence the use amount of the colorant (colorant content in the colored layer) can be increased. As a result, particularly when the black colored layer is formed, a colored layer having an extremely low total light transmittance and having an excellent light-shielding function can be formed. In one embodiment, the binder resin is an acrylic resin, preferably an acrylic resin containing a polyfunctional monomer (e.g., pentaerythritol triacrylate) as a copolymerization component. When the acrylic resin containing a polyfunctional monomer as a copolymerization component is used, a colored layer having an appropriate modulus of elasticity can be formed.

Any appropriate colorant may be used as the colorant depending on purposes. Specific examples of the colorant include: inorganic pigments, such as titanium white, zinc white, carbon black, iron black, iron oxide red, chrome vermilion, ultramarine, cobalt blue, chrome yellow, and titanium yellow; organic pigments or dyes, such as phthalocyanine blue, indanthrene blue, isoindolinone yellow, benzidine yellow, quinacridone red, polyazo red, perylene red, and aniline black; metal pigments formed of scale-like foil pieces of aluminum, brass, and the like; and pearlescent pigments (pearl pigments) formed of scale-like foil pieces of titanium dioxide-coated mica, basic lead carbonate, and the like. When the black colored layer is formed, carbon black, iron black, or aniline black is suitably used. In this case, the colorants are preferably used in combination thereof. This is because a colored layer having no hue (that is, being jet black) by absorbing visible light in a wide range and uniformly can be formed. For example, in addition to the above-mentioned colorant, an azo compound and/or a quinone compound may be used. In one embodiment, the colorant contains the carbon black as a main component and another colorant (e.g., an azo compound and/or a quinone compound). According to such configuration, a colored layer having no hue and being excellent in temporal stability can be formed. When the black colored layer is formed, the colorant may be used at a ratio of preferably from 50 parts by weight to 200 parts by weight with respect to 100 parts by weight of the binder resin. In this case, the content of the carbon black in the colorant is preferably from 80% to 100%. When the colorant (in particular, the carbon black) is used at such ratio, a colored layer having an extremely low total light transmittance and being excellent in temporal stability can be formed.

Figure 3:
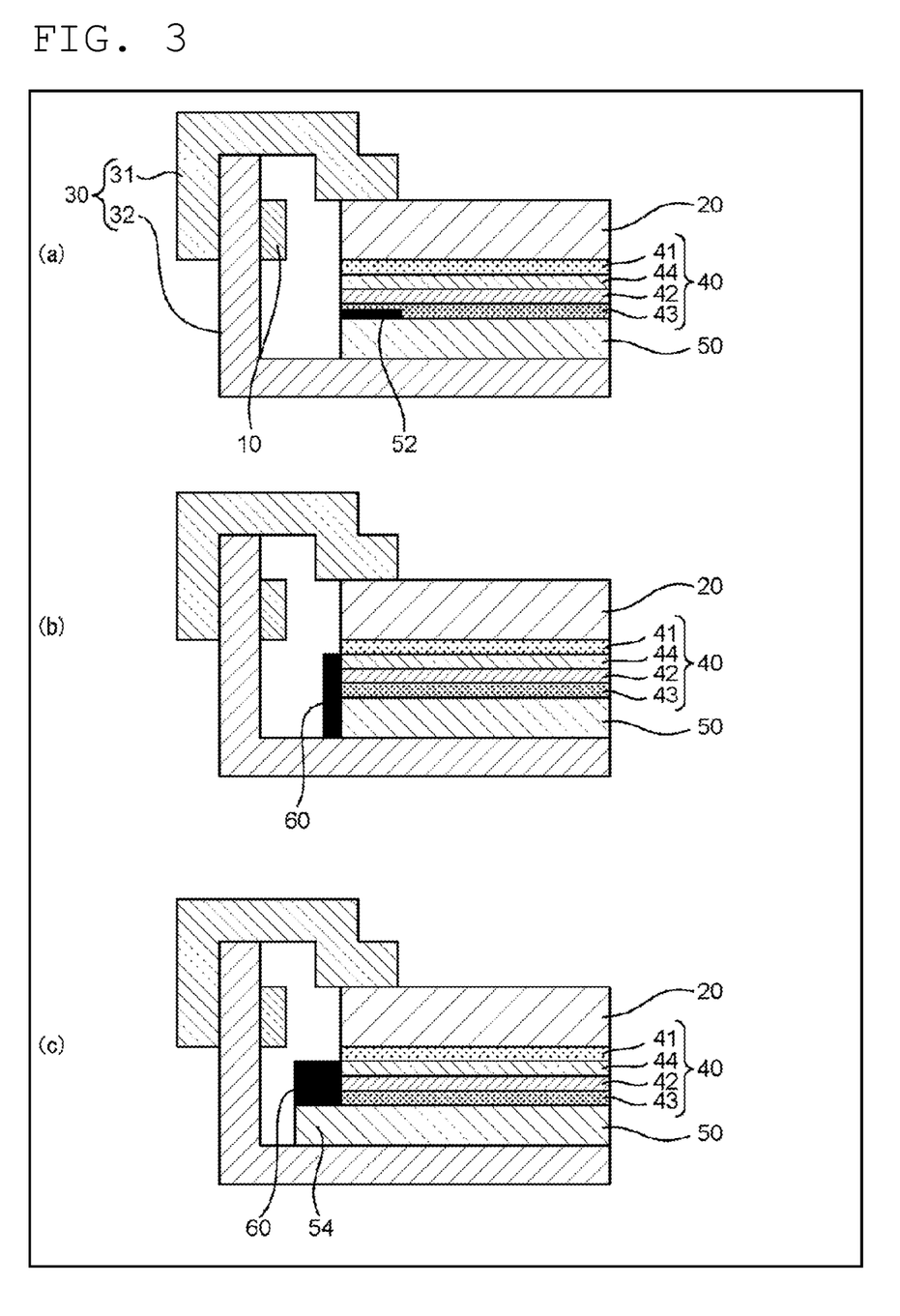
FIG. 3(a) to FIG. 3(c) are each a schematic partial sectional view for illustrating a specific example of a light-shielding configuration in the embodiment of the present invention.

In the example illustrated in FIG. 3(*b*), a light-shielding portion 60 is arranged on the light source-side end surface of the low-refractive index layer 42. Although the light-shielding portion 60 only needs to be arranged on the light source-side end surface of the low-refractive index layer 42 in an optical sense, the portion may be substantially arranged on the light source-side end surface of the double-sided pressure-sensitive adhesive film 40 (or the double-sided pressure-sensitive adhesive film excluding the first pressure-sensitive adhesive layer), or on the light source-side end surface of the double-sided pressure-sensitive adhesive film 40 (or the double-sided pressure-sensitive adhesive film excluding the first pressure-sensitive adhesive layer) and the light source-side end surface of the reflective plate 50. Examples of the light-shielding portion 60 include a light-shielding tape, a solidified product or a cured product of an applied film of a light-shielding resin solution, and a light-shielding formed body. The light-shielding tape typically includes a light-shielding substrate and a pressure-sensitive adhesive layer or an adhesive layer. The light-shielding substrate is typically a resin film containing a colorant. The colorants described for the example of FIG. 3(*a*) may each be used as the colorant. The light-shielding substrate is typically a black tape. In one embodiment, the solidified product or cured product of the applied film of the light-shielding resin solution is the same as the above-mentioned light-shielding printed layer. The light-shielding resin solution may be, for example, an ink or a paint for forming the light-shielding printed layer. In another embodiment, the light-shielding resin solution may contain any appropriate thermoplastic resin as a binder. The light-shielding portion is formed not by printing such ink or paint but by applying and solidifying or curing the ink or the paint because of a limitation on the position at which the portion is formed. The light-shielding formed body is a formed body of a light-shielding resin as its name suggests. The light-shielding resin typically contains a base resin (binder) and a colorant. The light-shielding formed body may be, for example, a box-like product or a plate-like product. As in the foregoing, the total light transmittance of the light-shielding portion in a thickness of from 3 μm to 5 μm is preferably 0.01% or less, more preferably 0.008% or less. The total light transmittance of the light-shielding portion is preferably as small as possible, and its lower limit may be, for example, 0.001%.

In the example illustrated in FIG. 3(*c*), the reflective plate 50 has an extending portion 54 extending toward the light source with respect to the double-sided pressure-sensitive adhesive film 40, and the light-shielding portion 60 is arranged on the extending portion 54.

Figure 4:
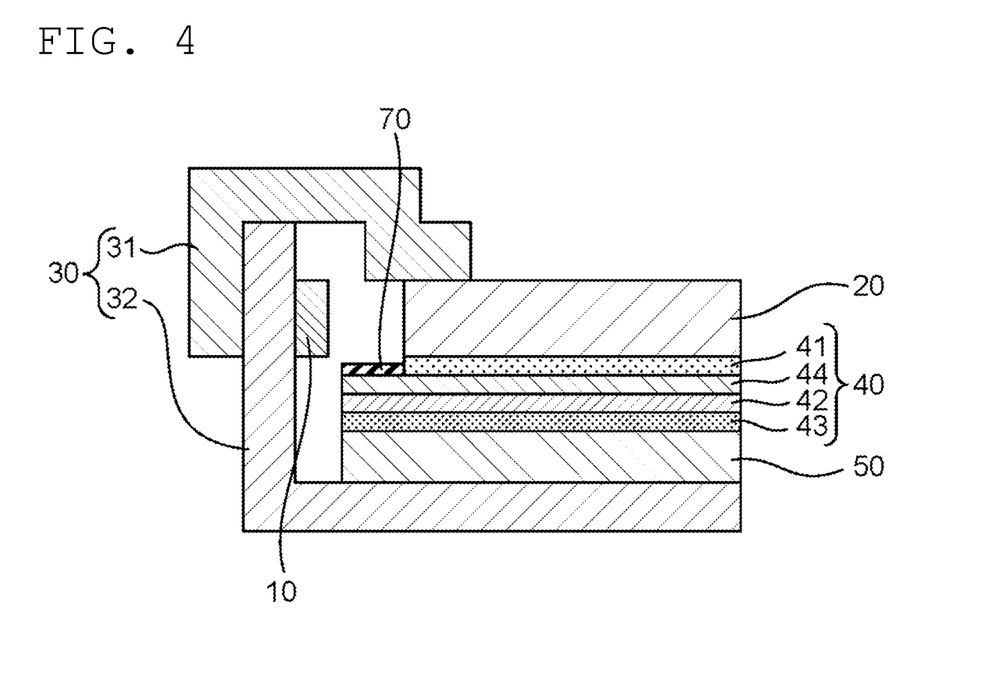
FIG. 4 is a schematic partial sectional view for illustrating another specific example of the light-shielding configuration in the embodiment of the present invention.

FIG. 4 is a schematic partial sectional view for illustrating another specific example of the light-shielding configuration. In the example illustrated in FIG. 4, the low-refractive index layer 42 and the reflective plate 50 each have an extending portion extending toward the light source with respect to the light guide plate 20. Although the low-refractive index layer 42 only needs to have the extending portion in an optical sense, each of the substrate 44, the second pressure-sensitive adhesive layer 43, and the reflective plate 50 may also substantially (structurally) have an extending portion for supporting the extending portion of the low-refractive index layer 42 like the illustrated example. The extending portions preferably extend up to a position corresponding to the emitting surface of the light source (e.g., a LED). As illustrated in the figure, a reflective layer 70 is more preferably arranged on the extending portions. Such configuration enables the low-refractive index layer to reflect the light emitted from the light source, and hence can prevent the entry of the light into the pressure-sensitive adhesive layer and the substrate. Details about the reflective layer 70 are described below.

In the example illustrated in FIG. 4, as described above, the reflective layer 70 is preferably further arranged on the extending portion of the low-refractive index layer 42 (in the figure, the substrate 44). The arrangement of the reflective layer can more satisfactorily suppress the light leakage near the surface that the light from the light source enters. Any appropriate configuration may be adopted as the reflective layer. For example, the reflective layer may be a reflective plate described in the section A for the reflective plate 50, or may be a metal-deposited film. The reflectance of the reflective layer is preferably from 80% to 100%, more preferably from 95% to 100%. When the first pressure-sensitive adhesive layer 41 has the extending portion, the reflective layer 70 may be bonded to the first pressure-sensitive adhesive layer 41. When the first pressure-sensitive adhesive layer 41 is free of any extending portion, the reflective layer 70 may be bonded to the extending portion of the low-refractive index layer via any appropriate pressure-sensitive adhesive layer or adhesive layer, or may be directly formed on the extending portion of the low-refractive index layer.

Figure 5:
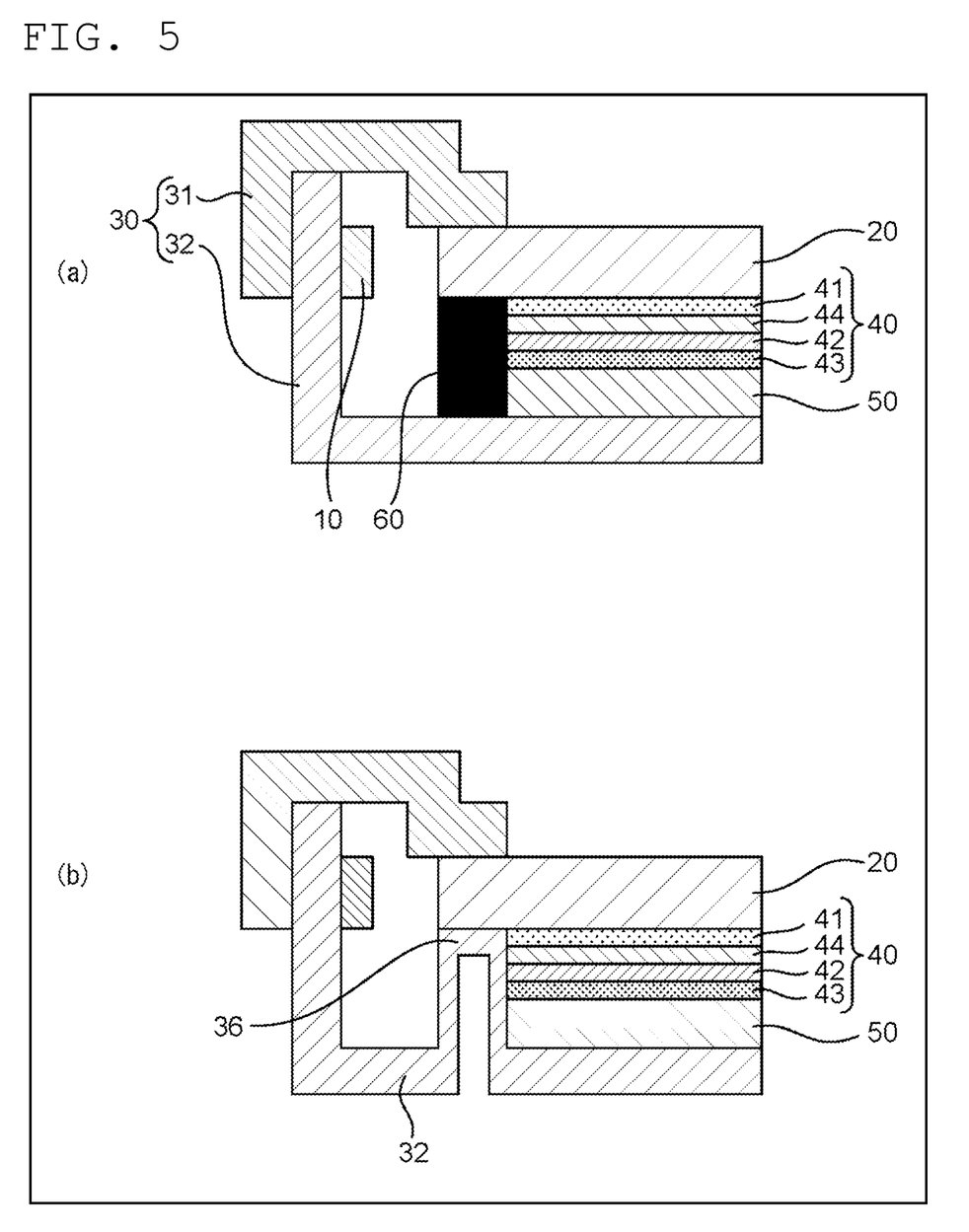
FIG. 5(a) and FIG. 5(b) are each a schematic partial sectional view for illustrating still another specific example of the light-shielding configuration in the embodiment of the present invention.

FIG. 5(a) and FIG. 5(b) are each a schematic partial sectional view for illustrating still another specific example of the light-shielding configuration. In the example illustrated in FIG. 5(a), in the light source-side end portion of the light guide plate 20, the end surfaces of the double-sided pressure-sensitive adhesive film 40 and the reflective plate 50 are positioned to be more distant from the light source 10 than the end surface of the light guide plate 20 is. Thus, a void portion is formed on the back surface side of the light source-side end portion of the light guide plate 20. In the illustrated example, the light-shielding portion 60 is arranged in the void portion. As in the foregoing, examples of the light-shielding portion 60 include a light-shielding tape, a solidified product or a cured product of an applied film of a light-shielding resin solution, and a light-shielding formed body. The light-shielding formed body preferably has a shape matching the shape of the void portion. Such configuration can prevent the tilt, misalignment, and the like of the light guide plate 20.

Also in the example illustrated in FIG. 5(b), as in the example illustrated in FIG. 5(a), a void portion is formed on the back surface side of the light source-side end portion of the light guide plate 20. In the example illustrated in FIG. 5(b), a protruding portion 36 is arranged at the position of the back portion 32 of the casing 30 corresponding to the void portion. The casing has a light-shielding property, and hence the protruding portion 36 can function as a light-shielding configuration. The protruding portion 36 may preferably have a shape matching the shape of the void portion to substantially support the light guide plate.

C. Double-Sided Pressure-Sensitive Adhesive Film

C-1. Outline of Double-Sided Pressure-Sensitive Adhesive Film

As described in the section A, the double-sided pressure-sensitive adhesive film 40 includes the first pressure-sensitive adhesive layer 41, the low-refractive index layer 42, the substrate 44 to be used as required, and the second pressure-sensitive adhesive layer 43 from the light guide plate 20 side.

C-2. Substrate

The substrate 44 may be typically formed of a film or plate-shaped product of a resin (preferably a transparent resin). Typical examples of such resin include a thermoplastic resin and a reactive resin (e.g., an ionizing radiation-curable resin). Specific examples of the thermoplastic resin include: a (meth)acrylic resin, such as polymethyl methacrylate (PMMA) or polyacrylonitrile; a polycarbonate (PC) resin; a polyester resin such as PET; a cellulose-based resin such as triacetyl cellulose (TAC); a cyclic polyolefin-based resin; and a styrene-based resin. Specific examples of the ionizing radiation-curable resin include an epoxy acrylate-based resin and a urethane acrylate-based resin. Those resins may be used alone or in combination thereof.

The thickness of the substrate is, for example, from 10 μm to 100 μm, preferably from 10 μm to 50 μm.

The refractive index of the substrate is preferably 1.47 or more, more preferably from 1.47 to 1.60, still more preferably from 1.47 to 1.55. When the refractive index falls within such ranges, light extracted from the light guide plate can be introduced into an image display cell without being adversely affected.

C-3. Low-Refractive Index Layer

The low-refractive index layer 42 typically has pores therein. The porosity of the low-refractive index layer is, for example, 40% or more, typically 50% or more, preferably 70% or more, more preferably 80% or more. Meanwhile, the porosity is, for example, 90% or less, preferably 85% or less. When the porosity falls within the ranges, the refractive index of the low-refractive index layer can be set within an appropriate range. The porosity is a value calculated from the value of the refractive index measured with an ellipsometer by using Lorentz-Lorenz's formula.

The refractive index of the low-refractive index layer is preferably 1.30 or less, more preferably 1.20 or less, still more preferably 1.15 or less. The lower limit of the refractive index may be, for example, 1.01. When the refractive index falls within such ranges, extremely excellent light utilization efficiency can be achieved in the backlight unit. The refractive index refers to a refractive index measured at a wavelength of 550 nm unless otherwise stated. The refractive index is a value measured by a method described in the section "(1) Refractive Index of Low-refractive Index Layer" in Examples below.

Any appropriate configuration may be adopted for the low-refractive index layer as long as the layer has the above-mentioned desired porosity and refractive index. The low-refractive index layer may be preferably formed through, for example, application or printing. Materials described in, for example, WO 2004/113966 A1, JP 2013-254183 A, and JP 2012-189802 A may each be adopted as a material for forming the low-refractive index layer. Specific examples thereof include: silica-based compounds; hydrolyzable silanes, and partial hydrolysates and dehydration condensates thereof; organic polymers; silanol group-containing silicon compounds; active silica obtained by bringing a silicate into contact with an acid or an ion-exchange resin; polymerizable monomers (e.g., a (meth)

acrylic monomer and a styrene-based monomer); curable resins (e.g., a (meth)acrylic resin, a fluorine-containing resin, and a urethane resin); and combinations thereof. The low-refractive index layer may be formed by, for example, applying or printing a solution or a dispersion liquid of such material.

The size of each of the pores (holes) in the low-refractive index layer refers to a major axis diameter out of the major axis diameter and minor axis diameter of the pore (hole). The sizes of the pores (holes) are, for example, from 2 nm to 500 nm. The sizes of the pores (holes) are, for example, 2 nm or more, preferably 5 nm or more, more preferably 10 nm or more, still more preferably 20 nm or more. Meanwhile, the sizes of the pores (holes) are, for example, 500 nm or less, preferably 200 nm or less, more preferably 100 nm or less. The range of the sizes of the pores (holes) is, for example, from 2 nm to 500 nm, preferably from 5 nm to 500 nm, more preferably from 10 nm to 200 nm, still more preferably from 20 nm to 100 nm. The sizes of the pores (holes) may be adjusted to desired sizes in accordance with, for example, a purpose and an application. The sizes of the pores (holes) may be quantified by a BET test method.

The sizes of the pores (holes) may be quantified by a BET test method. Specifically, 0.1 g of the sample (formed pore layer) is loaded into the capillary of a specific surface area-measuring apparatus (manufactured by Micromeritics Instrument Corporation, ASAP 2020), and is then dried under reduced pressure at room temperature for 24 hours so that a gas in its pore structure may be removed. Then, an adsorption isotherm is drawn by causing the sample to adsorb a nitrogen gas, and its pore size distribution is determined. Thus, the pore sizes may be evaluated.

The haze of the low-refractive index layer is, for example, less than 5%, preferably less than 3%. Meanwhile, the haze is, for example, 0.1% or more, preferably 0.2% or more. The range of the haze is, for example, 0.1% or more and less than 5%, preferably 0.2% or more and less than 3%. The haze is an indicator of the transparency of the low-refractive index layer, and may be measured by, for example, such a method as described below.

The pore layer (low-refractive index layer) is cut into a size measuring 50 mm by 50 mm, and is set in a haze meter (manufactured by Murakami Color Research Laboratory Co., Ltd.: HM-150), followed by the measurement of its haze. The haze value is calculated from the following equation.

Haze (%)=[diffuse transmittance (%)/total light transmittance (%)]×100 (%)

The low-refractive index layer having the pores therein is, for example, a low-refractive index layer having a porous layer and/or an air layer in at least part thereof. The porous layer typically contains aerogel and/or particles (e.g., hollow fine particles and/or porous particles). The low-refractive index layer may be preferably a nanoporous layer (specifically a porous layer in which the diameters of 90% or more of micropores fall within the range of from $10^{-1}$ nm to $10^3$ nm).

Any appropriate particles may be adopted as the particles. The particles are each typically formed of a silica-based compound. Examples of the shapes of the particles include a spherical shape, a plate shape, a needle shape, a string shape, and a botryoidal shape. String-shaped particles are, for example, particles in which a plurality of particles each having a spherical shape, a plate shape, or a needle shape are strung together like beads, short fiber-shaped particles (e.g., short fiber-shaped particles described in JP 2001-188104 A), and a combination thereof. The string-shaped particles may be linear or may be branched. Botryoidal-shaped particles are, for example, particles in which a plurality of spherical, plate-shaped, and needle-shaped particles aggregate to form a botryoidal shape. The shapes of the particles may be identified through, for example, observation with a transmission electron microscope.

The thickness of the low-refractive index layer is preferably from 0.2 μm to 5 μm, more preferably from 0.3 μm to 3 μm. When the thickness of the low-refractive index layer falls within such ranges, an excellent total reflection function is achieved, and as a result, an excellent light guide function can be achieved.

Details about specific configurations of the low-refractive index layer and the method of forming the low-refractive index layer are described in, for example, WO 2019/151073 A1, the description of which is incorporated herein by reference.

C-4. First Pressure-Sensitive Adhesive Layer

The first pressure-sensitive adhesive layer 41 includes any appropriate pressure-sensitive adhesive. The first pressure-sensitive adhesive layer may be identical to or different from the second pressure-sensitive adhesive layer to be described later. The thickness of the first pressure-sensitive adhesive layer is preferably from 5 μm to 200 μm, more preferably from 10 μm to 150 μm.

C-5. Second Pressure-Sensitive Adhesive Layer

The second pressure-sensitive adhesive layer 43 has such hardness that under a normal state, a pressure-sensitive adhesive for forming the pressure-sensitive adhesive layer does not permeate the pores of the low-refractive index layer. The storage modulus of elasticity of the second pressure-sensitive adhesive layer at 23° C. is, for example, from $1.0\times10^5$ (Pa) to $1.0\times10^7$ (Pa), preferably from $1.3\times10^5$ (Pa) to $1.0\times10^6$ (Pa), more preferably from $1.5\times10^5$ (Pa) to $5.0\times10^5$ (Pa). When the storage modulus of elasticity of the second pressure-sensitive adhesive layer adjacent to the low-refractive index layer is set within such ranges as described above, the pressure-sensitive adhesive for forming the second pressure-sensitive adhesive layer can be prevented from entering the pores of the low-refractive index layer. Accordingly, the refractive index of the low-refractive index layer is maintained low, and the lowering effect can be maintained. The storage modulus of elasticity is determined by reading a value at 23° C. at the time of measurement in conformity with a method described in JIS K 7244-1 "Plastics-Determination of dynamic mechanical properties" under the condition of a frequency of 1 Hz in the range of from −50° C. to 150° C. at a rate of temperature increase of 5° C./min.

Any appropriate pressure-sensitive adhesive may be used as the pressure-sensitive adhesive for forming the second pressure-sensitive adhesive layer as long as the pressure-sensitive adhesive has such characteristic as described above. The pressure-sensitive adhesive is typically, for example, an acrylic pressure-sensitive adhesive (acrylic pressure-sensitive adhesive composition). The acrylic pressure-sensitive adhesive composition typically contains a (meth)acrylic polymer as a main component (base polymer). The (meth)acrylic polymer may be incorporated into the pressure-sensitive adhesive composition at a ratio of, for example, 50 wt % or more, preferably 70 wt % or more, more preferably 90 wt % or more in the solid content of the pressure-sensitive adhesive composition. The (meth)acrylic polymer contains, as a main component, an alkyl (meth) acrylate serving as a monomer unit. The term "(meth) acrylate" refers to an acrylate and/or a methacrylate. The alkyl group of the alkyl (meth)acrylate is, for example, a linear or branched alkyl group having 1 to 18 carbon atoms. The average number of carbon atoms of the alkyl group is preferably from 3 to 9. As a monomer for forming the (meth)acrylic polymer, in addition to the alkyl (meth)acrylate, there are given comonomers, such as a carboxyl group-containing monomer, a hydroxyl group-containing monomer, an amide group-containing monomer, an aromatic ring-containing (meth)acrylate, and a heterocycle-containing (meth)acrylate. The comonomer is preferably a hydroxyl group-containing monomer and/or a heterocycle-containing (meth)acrylate, more preferably N-acryloylmorpholine. The acrylic pressure-sensitive adhesive composition may preferably contain a silane coupling agent and/or a cross-linking agent. The silane coupling agent is, for example, an epoxy group-containing silane coupling agent. The cross-linking agent is, for example, an isocyanate-based cross-linking agent or a peroxide-based cross-linking agent. Details about such pressure-sensitive adhesive layer or acrylic pressure-sensitive adhesive composition are described in, for example, JP 4140736 B2, the description of which is incorporated herein by reference.

The thickness of the second pressure-sensitive adhesive layer is preferably from 3 μm to 30 μm, more preferably from 5 μm to 10 μm. When the thickness of the second pressure-sensitive adhesive layer falls within such ranges, the following advantage is obtained: an influence of the thickness of the second pressure-sensitive adhesive layer on the entire thickness of the backlight unit is small while the layer has a sufficient adhesive strength.

D. Image Display Apparatus

The backlight unit may be suitably used in an image display apparatus (e.g., a liquid crystal display). Accordingly, the embodiment of the present invention also encompasses such image display apparatus. The image display apparatus includes the backlight unit described above and an image display panel arranged on the emitting surface side of the light guide plate of the unit.

EXAMPLES

Now, the present invention is specifically described by way of Examples. However, the present invention is not limited to these Examples. Measurement methods for characteristics are as described below. In addition, unless otherwise specified, "%" and "part(s)" in Examples are by weight.

(1) Refractive Index of Low-Refractive Index Layer

After a low-refractive index layer had been formed on an acrylic film, the resultant was cut into a size measuring 50 mm by 50 mm, and the piece was bonded to the front surface of a glass plate (thickness: 3 mm) via a pressure-sensitive adhesive layer. A central portion (having a diameter of about 20 mm) on the rear surface of the glass plate was daubed with a black marker pen. Thus, a sample in which light was not reflected on the rear surface of the glass plate was obtained. The sample was set in an ellipsometer (manufactured by J. A. Woollam Japan: VASE), and its refractive index was measured under the conditions of a wavelength of 550 nm and an incident angle of from 50° to 80°.

(2) Brightness Uniformity

Each of backlight units obtained in Examples and Comparative Example was lit, and its brightness uniformity was visually observed. The uniformity was evaluated by the following criteria.

○: The brightness of the backlight unit is uniform over the entirety thereof.

x: Light leakage is observed near a surface that light from a light source enters.

[Production Example 1] Preparation of Coating Liquid for Forming Low-Refractive Index Layer (1) Gelation of Silicon Compound 0.95 g of methyltrimethoxysilane (MTMS) that was a precursor of a silicon compound was dissolved in 2.2 g of dimethyl sulfoxide (DMSO). Thus, a mixed liquid A was prepared. 0.5 g of a 0.01 mol/L aqueous solution of oxalic acid was added to the mixed liquid A, and the mixture was stirred at room temperature for 30 minutes so that MTMS was hydrolyzed. Thus, a mixed liquid B containing tris (hydroxy)methylsilane was produced.

0.38 g of 28 wt % ammonia water and 0.2 g of pure water were added to 5.5 g of DMSO, and then the mixed liquid B was further added to the mixture, followed by stirring at room temperature for 15 minutes to perform the gelation of tris(hydroxy)methylsilane. Thus, a mixed liquid C containing a gel-like silicon compound was obtained.

(2) Aging Treatment

Aging treatment was performed by incubating the mixed liquid C containing the gel-like silicon compound, which had been prepared as described above, as it was at 40° C. for 20 hours.

(3) Pulverization Treatment

Next, the gel-like silicon compound subjected to the aging treatment as described above was crushed into granular shapes each having a size of from several millimeters to several centimeters with a spatula. Next, 40 g of isopropyl alcohol (IPA) was added to the mixed liquid C, and the mixture was lightly stirred. After that, the mixture was left at rest at room temperature for 6 hours so that the solvent and the catalyst in the gel were decanted. Similar decantation treatment was performed three times to replace the solvent with IPA. Thus, a mixed liquid D was obtained. Next, the gel-like silicon compound in the mixed liquid D was subjected to pulverization treatment (high-pressure media-less pulverization). The pulverization treatment (high-pressure media-less pulverization) was performed as follows: a homogenizer (manufactured by SMT Co., Ltd., product name: "UH-50") was used, and 1.85 g of the gel-like silicon compound and 1.15 g of IPA in the mixed liquid D were weighed in a 5-cubic centimeter screw bottle, followed by the performance of the pulverization of the mixture under the conditions of 50 W and 20 kHz for 2 minutes.

The gel-like silicon compound in the mixed liquid D was pulverized by the pulverization treatment, and hence the mixed liquid was turned into a sol liquid of the pulverized products (a mixed liquid D'). A volume-average particle diameter representing a variation in particle size of the pulverized products in the mixed liquid D' was determined to be from 0.50 to 0.70 with a dynamic light scattering-type nanotrack particle size analyzer (manufactured by Nikkiso Co., Ltd., UPA-EX150). Further, a methyl ethyl ketone (MEK) solution of a photobase generator (Wako Pure Chemical Industries, Ltd.: product name: WPBG-266) having a concentration of 1.5 wt % and a MEK solution of bis(trimethoxysilyl)ethane having a concentration of 5% were added at ratios of 0.062 g and 0.036 g, respectively to 0.75 g of the sol liquid (mixed liquid D'). Thus, a coating liquid for forming a low-refractive index layer was obtained.

[Production Example 2] Preparation of Pressure-Sensitive Adhesive for Forming First Pressure-Sensitive Adhesive Layer 90.7 Parts of butyl acrylate, 6 parts of N-acryloylmorpholine, 3 parts of acrylic acid, 0.3 part of 2-hydroxybutyl acrylate, and 0.1 part by weight of 2,2'-azobisisobutyronitrile serving as a polymerization initiator were loaded into a four-necked flask including a stirring blade, a temperature gauge, a nitrogen gas-introducing tube, and a condenser together with 100 g of ethyl acetate, and a nitrogen gas was introduced to purge the flask with nitrogen while the mixture was gently stirred. After that, a liquid temperature in the flask was kept at around 55° C., and a polymerization reaction was performed for 8 hours to prepare an acrylic polymer solution. 0.2 Part of an isocyanate cross-linking agent (CORONATE L manufactured by Nippon Polyurethane Industry Co., Ltd., tolylene diisocyanate adduct of trimethylolpropane), 0.3 part of benzoyl peroxide (NYPER BMT manufactured by Nippon Oil & Fats Co., Ltd.), and 0.2 part of γ-glycidoxypropylmethoxysilane (manufactured by Shin-Etsu Chemical Co., Ltd.: KBM-403) were blended into 100 parts of the solid content of the resultant acrylic polymer solution to prepare an acrylic pressure-sensitive adhesive solution. Next, the acrylic pressure-sensitive adhesive solution was applied to one surface of a silicone-treated polyethylene terephthalate (PET) film (manufactured by Mitsubishi Chemical Polyester Film Co., Ltd., thickness: 38 μm) so that the thickness of a pressure-sensitive adhesive layer after drying became 20 μm, followed by drying at 150° C. for 3 minutes. Thus, the pressure-sensitive adhesive layer was formed. The resultant pressure-sensitive adhesive layer had a storage modulus of elasticity at 23° C. of $1.3 \times 10^5$ (Pa).

[Production Example 3] Preparation of Pressure-Sensitive Adhesive for Forming Second Pressure-Sensitive Adhesive Layer 99 Parts of butyl acrylate, 1 part of 4-hydroxybutyl acrylate, and 0.1 part of 2,2'-azobisisobutyronitrile serving as a polymerization initiator were loaded into a four-necked flask including a stirring blade, a temperature gauge, a nitrogen gas-introducing tube, and a condenser together with 100 parts of ethyl acetate, and a nitrogen gas was introduced to purge the flask with nitrogen while the mixture was gently stirred. After that, a liquid temperature in the flask was kept at around 55° C., and a polymerization reaction was performed for 8 hours to prepare an acrylic polymer solution. 0.1 Part of an isocyanate cross-linking agent (TAKENATE D110N manufactured by Mitsui Takeda Chemicals Inc., trimethylolpropane xylylene diisocyanate), 0.1 part of benzoyl peroxide (NYPER BMT manufactured by Nippon Oil & Fats Co., Ltd.), and 0.2 part of γ-glycidoxypropylmethoxysilane (manufactured by Shin-Etsu Chemical Co., Ltd.: KBM-403) were blended into 100 parts of the solid content of the resultant acrylic polymer solution to prepare an acrylic pressure-sensitive adhesive composition solution. Next, the acrylic pressure-sensitive adhesive composition solution was applied to one surface of a polyethylene terephthalate film treated with a silicone-based releasing agent (separator film: manufactured by Mitsubishi Chemical Polyester Film Co., Ltd., MRF 38), and was dried at 150° C. for 3 minutes to form a pressure-sensitive adhesive layer having a thickness of 20 μm on the surface of the separator film. The resultant pressure-sensitive adhesive layer had a storage modulus of elasticity at 23° C. of $8.2 \times 10^4$ (Pa).

[Production Example 4] Production of Double-Sided Pressure-Sensitive Adhesive Film The coating liquid for forming a low-refractive index layer prepared in Production Example 1 was applied to a substrate having a thickness of 30 μm (acrylic film). The wet thickness (thickness before drying) of the coating layer was about 27 μm. The coating layer was treated at a temperature of 100° C. for 1 minute to be dried. Thus, a low-refractive index layer (thickness: 0.9 μm) was formed on the substrate. The resultant low-refractive index layer had a porosity of 56% and a refractive index of 1.15. Next, a first pressure-sensitive adhesive layer (thickness: 10 μm) including the pressure-sensitive adhesive prepared in Production Example 2 was formed on the surface of the low-refractive index layer. Further, a second pressure-sensitive adhesive layer (thickness: 28 μm) including the pressure-sensitive adhesive prepared in Production Example 3 was formed on the surface of the substrate. Thus, a double-sided pressure-sensitive adhesive film, which had the configuration "first pressure-sensitive adhesive layer/low-refractive index layer/substrate/second pressure-sensitive adhesive layer," was produced.

Example 1

A backlight unit was taken out from a commercial liquid crystal display apparatus (manufactured by KING JIM Co., Ltd., product name: "XMC10"). A light guide plate was taken out from the backlight unit (substantially, its casing). Meanwhile, a light-shielding printed layer having a width of 1.5 mm was formed on the light source-side end portion of a commercial reflective plate (manufactured by Toray Industries, Inc., product name: "LUMIRROR (trademark) #225 E6SR") with a black ink (manufactured by PILOT Corporation, CD/DVD MARKER BLACK MFD-15EU-B). That is, such a light-shielding configuration as illustrated in FIG. 3(a) was arranged. The above-mentioned light guide plate and the reflective plate having formed thereon the light-shielding printed layer were bonded to each other via the double-sided pressure-sensitive adhesive film obtained in Production Example 4 to provide a laminate. At this time, the light guide plate was bonded to the first pressure-sensitive adhesive layer. The resultant laminate was incorporated into the casing again to produce a backlight unit. The resultant backlight unit was subjected to the above-mentioned evaluation (2). The result is shown in Table 1.

Example 2

A commercial light-shielding tape (manufactured by DIC Corporation, product name: "DAITAC LS-050H", width: 0.5 mm) was bonded to the end portion of the double-sided pressure-sensitive adhesive film obtained in Production Example 4 so as to cover the end surface thereof. Thus, a light-shielding portion was arranged. That is, such a light-shielding configuration as illustrated in FIG. 3(b) was arranged. A backlight unit was produced in the same manner as in Example 1 except that the double-sided pressure-sensitive adhesive film was used. The resultant backlight unit was subjected to the same evaluation as that of Example 1. The result is shown in Table 1.

Example 3

The light guide plate and the reflective plate were bonded to each other via the double-sided pressure-sensitive adhesive film in the same manner as in Example 1 except that the light source-side end portion of the reflective plate was adapted to extend by 2 mm. Thus, a laminate was obtained. Next, 2 commercial light-shielding tapes (manufactured by DIC Corporation, product name: "DAITAC LS-050H", black pressure-sensitive adhesive tapes each having a width of 1.5 mm) were bonded to the extending portion of the reflective plate in an overlapping manner so as to be brought into abutment with the end surface of the low-refractive index layer. Thus, a light-shielding portion was arranged. That is, such a light-shielding configuration as illustrated in FIG. 3(c) was arranged. A backlight unit was produced in the same manner as in Example 1 except that the laminate was used. The resultant backlight unit was subjected to the same evaluation as that of Example 1. The result is shown in Table 1.

Example 4

The light guide plate and the reflective plate were bonded to each other via the double-sided pressure-sensitive adhesive film in the same manner as in Example 1 except that the low-refractive index layer, substrate, and second pressure-sensitive adhesive layer of the double-sided pressure-sensitive adhesive film, and the reflective plate were each adapted to extend up to a position corresponding to the emitting surface of the light source (LED) of a backlight unit. Thus, a laminate was obtained. That is, such a light-shielding configuration as illustrated in FIG. 4 (provided that no reflective layer was present) was arranged. A backlight unit was produced in the same manner as in Example 1 except that the laminate was used. The resultant backlight unit was subjected to the same evaluation as that of Example 1. The result is shown in Table 1.

Example 5

The light guide plate and the reflective plate were bonded to each other via the double-sided pressure-sensitive adhesive film in the same manner as in Example 1 except that the end surfaces of the double-sided pressure-sensitive adhesive film and the reflective plate were made more distant from the light source by 2 mm than the end surface of the light guide plate was, to thereby form a void portion. Thus, a laminate was obtained. Next, 5 commercial light-shielding tapes (manufactured by DIC Corporation, product name: "DAI-TAC LS-050H", black pressure-sensitive adhesive tapes each having a width of 1.5 mm) were bonded to the position of the back portion of the casing corresponding to the void portion in an overlapping manner. Thus, a light-shielding portion was arranged. That is, such a light-shielding configuration as illustrated in FIG. 5(a) was arranged. The laminate was incorporated into the casing to produce a backlight unit. The resultant backlight unit was subjected to the same evaluation as that of Example 1. The result is shown in Table 1.

Comparative Example 1

A backlight unit was produced in the same manner as in Example 1 except that no light-shielding printed layer was formed (i.e., no light-shielding configuration was arranged) on the reflective plate. The resultant backlight unit was subjected to the same evaluation as that of Example 1. The result is shown in Table 1.

TABLE 1

|  | Light-shielding configuration | Brightness uniformity |
| --- | --- | --- |
| Example 1 | FIG. 3(a) | o |
| Example 2 | FIG. 3(b) | o |
| Example 3 | FIG. 3(c) | o |
| Example 4 | FIG. 4 (provided that no reflective layer is present) | o |
| Example 5 | FIG. 5(a) | o |
| Comparative Example 1 | None | x |

As is apparent from Table 1, it is understood that according to Examples of the present invention, the arrangement of a predetermined light-shielding configuration can achieve a backlight unit excellent in brightness uniformity.

INDUSTRIAL APPLICABILITY

The backlight unit of the present invention may be suitably used as the backlight unit of an image display apparatus (in particular, a liquid crystal display apparatus).

REFERENCE SIGNS LIST

10 light source
20 light guide plate
30 casing
40 double-sided pressure-sensitive adhesive film
41 first pressure-sensitive adhesive layer
42 low-refractive index layer
43 second pressure-sensitive adhesive layer
44 substrate
50 reflective plate
52 light-shielding printed layer
60 light-shielding portion
100 backlight unit

The invention claimed is:
1. A backlight unit, comprising:
a light source;
a light guide plate having:
an end surface arranged to face the light source wherein light from the light source enters said end surface;
an emitting surface side from which the entered light is emitted; and
a back surface side opposite the emitting surface side;
a reflective plate bonded to the back surface side of the light guide plate via a double-sided pressure-sensitive adhesive film;
a casing having a front portion and a back portion, the casing being configured to store the light source, the light guide plate, and the reflective plate,
wherein the double-sided pressure-sensitive adhesive film includes a first pressure-sensitive adhesive layer, a low-refractive index layer, and a second pressure-sensitive adhesive layer in the stated order from a light guide plate side, and
a light-shielding configuration arranged near a light source side end of the reflective plate or the double-sided pressure-sensitive adhesive film,
wherein the light-shielding configuration is configured so that the light from the light source is free from entering a space between the low-refractive index layer and the reflective plate, or so that the light that has entered the space between the low-refractive index layer and the reflective plate from the light source is free from being emitted from the emitting surface of the light guide plate wherein the low-refractive index layer and the reflective plate each have an extending portion extending toward the light source with respect to the light guide plate; and wherein the extending portion of the low-refractive index layer further has arranged thereon a reflective layer.

2. The backlight unit according to claim 1, wherein a light source-side end portion of the light guide plate has formed therein a void portion, which is defined by causing end surfaces of the double-sided pressure-sensitive adhesive film and the reflective plate to be more distant from the light source than the end surface of the light guide plate is, and wherein the light shielding configuration comprises a protruding portion matching a shape of the void portion arranged on a position of the back portion of the casing corresponding to the void portion.

3. The backlight unit according to claim 1, wherein the light source is a LED light source.

4. An image display apparatus, comprising:

the backlight unit of claim 1; and an image display panel arranged on an emitting surface side of the light guide plate.

* * * * *